United States Patent [19]
Li

[11] Patent Number: 5,256,360
[45] Date of Patent: Oct. 26, 1993

[54] METHOD OF MANUFACTURING A PRECISION MICRO-FILTER

[75] Inventor: Hong Li, Cambridge, Mass.

[73] Assignee: Panasonic Technologies, Inc., Cambridge, Mass.

[21] Appl. No.: 857,323

[22] Filed: Mar. 25, 1992

[51] Int. Cl.⁵ .................. B29C 33/42; B29C 39/00
[52] U.S. Cl. ........................... 264/219; 264/225; 264/299; 264/318; 264/DIG. 48
[58] Field of Search .......... 264/DIG. 48, DIG. 62, 264/41, 49, 45.1, 44, 219, 220, 221, 225, 227, 299, 318

[56] References Cited

U.S. PATENT DOCUMENTS

| | | | |
|---|---|---|---|
| 4,250,127 | 2/1981 | Warren et al. | 264/221 |
| 4,277,548 | 7/1981 | Vedder | 264/227 |
| 4,801,379 | 1/1989 | Ehrsam et al. | 264/DIG. 48 |
| 4,872,888 | 10/1989 | Ehrfeld et al. | 264/DIG. 48 |
| 5,069,697 | 12/1991 | Hamaguchi et al. | 264/44 |

FOREIGN PATENT DOCUMENTS 53-10473  9/1978  Japan ............................ 264/DIG. 48

OTHER PUBLICATIONS

Micro-EDM, Li, H. and Masaki, T., Society of Manufacturing Engineers Technical Paper, MS 91-485.
Micro-Electro-Discharge Machining, T. Masaki, K. Kawata, T. Sato, T. Mizutani, K. Yonemoti, A. Shibuya and T. Masuzawa, Proceedings of International Symposium for Electro-Machining, pp. 26-29, 1989.
Micro EDMing Excites the High Tech Community, EDM Today, pp. 32, 34, 46, Mar./Apr. 1991.
Micro Electro-Discharge Machine Brochure,, Panasonic Matsushita Research Institute, May 1990.
Electrical Discharge Machining; Dr. Hong Li, SME, presented at the Society of Manufacturing Engineers and the Machining of SME, Sep. 17-18, 1991.

*Primary Examiner*—Jay H. Woo
*Assistant Examiner*—Duane S. Smith
*Attorney, Agent, or Firm*—Ratner & Prestia

[57] ABSTRACT

A method of manufacturing a precision micro-filter and a micro-filter manufactured thereby is disclosed. A micro-mold is manufactured using micro-machining technology (such as micro-electrical-discharge machining technology, laser-beam micro-machining, electron beam micro-machining) to make a filter mold with a plurality of rod-like protrusions, of the shape, dimensions, and spacing required for the pores of a finished micro-filter. A molding material is placed into the micro-mold, the molding composition is allowed to solidify to form a micro-filter, the passageways of which conform precisely to the rod-like protrusions of the mold. This micro-filter is then separated from the micro-mold.

10 Claims, 4 Drawing Sheets 5,256,360

METHOD OF MANUFACTURING A PRECISION MICRO-FILTER

FIELD OF THE INVENTION

The present invention relates to precision micro-filters and more particularly to a method and a type of mold for making such micro-filters.

BACKGROUND OF THE INVENTION

Micro-filters are used, particularly in medicine and biotechnology, to separate and collect very small particles, such as cells, suspended or dissolved in a fluid. For such purposes, micro-filters are often needed with passageways of specific shapes and with an internal diameter on the order of 1 micron and larger.

A variety of methods are presently known for making micro-filters. One such method is to make a mold using integrated circuits (IC) processing and lithographic processes. This mold can be formed by using well known "mask and etch technology" to build up a plurality of layers which are subsequently separated from the base substrate. The resultant mold may then be filled with plastic to form a precision micro-filter. The resultant micro-filter, however, tends to have high internal strain. Furthermore, this manufacturing technique for making a micro-filter tends to be expensive and thus non-economical.

SUMMARY OF THE INVENTION

In accordance with the present invention, a micro-filter mold which includes a base and a plurality of rod-like protrusions is formed by micro-machining. A liquid molding material is then introduced into the resulting micro-filter mold. This liquid, material is allowed to solidify to form a precision micro-filter. The resulting precision micro-filter is then separated from the micro-filter mold. Preferably, a precisely controlled micro electrode discharge machine (EDM) is used to make the micro-filter mold.

DETAILED DESCRIPTION OF THE INVENTION

Figure 1A:
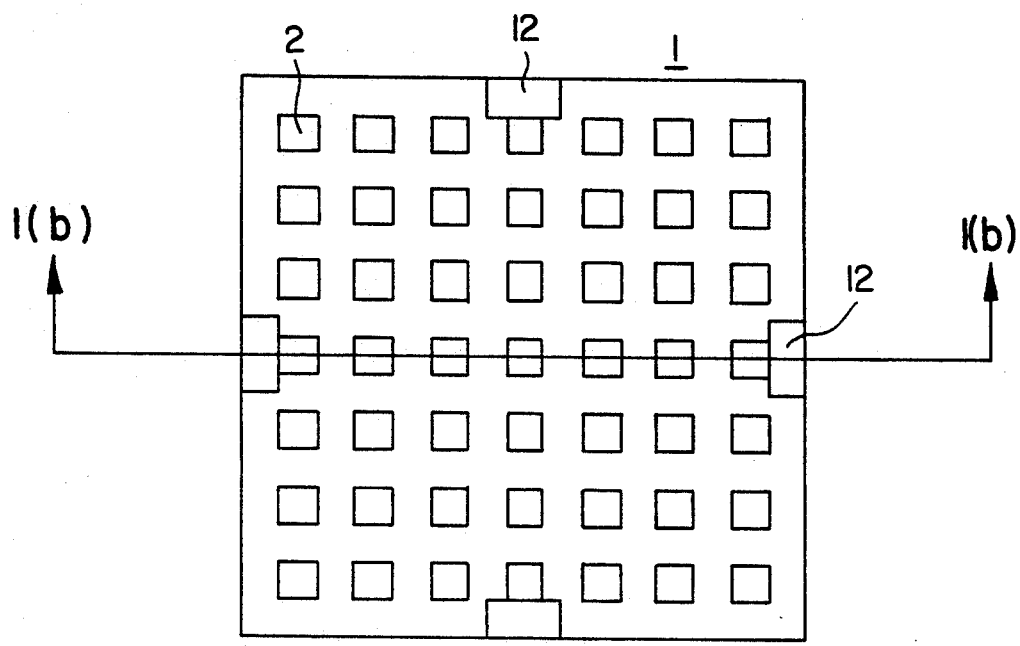
FIG. 1(a) is a top view showing the structure of a precision micro-filter.

Referring now to the drawings, an exemplary embodiment of the present invention will be described.

Figure 1B:
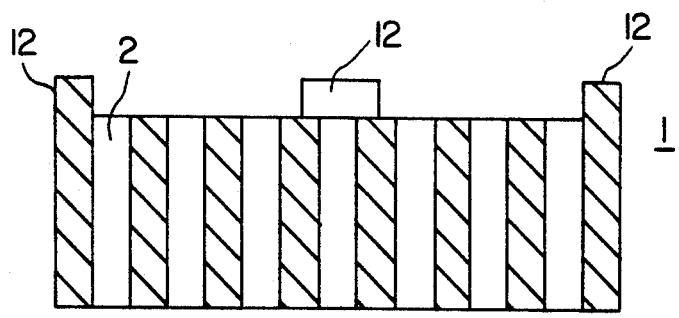
FIG. 1(b) is a side, cross-sectional view of the precision micro-filter of FIG. 1(a) taken in the plane A—A' shown in FIG. 1(a).

A top view of a precision micro-filter 1, constructed in accordance with an exemplary embodiment of the present invention is shown in FIG. 1(a). A side, cross-sectional view of the precision micro-filter of FIG. 1(a), taken in the plane A—A' shown in FIG. 1(a) is shown in FIG. 1(b). The micro-filter may be formed of any suitable molding composition which can be converted, such as by a change in temperature (solidification of a melt for example) from a fluid state to a solid state. Exemplary materials which may be used for this purpose include essentially any conventional thermoplastic resin, such as a polyester resin.

The micro-filter includes a plurality of microholes 2. Microholes 2 are shown in FIG. 1(a) and FIG. 1(b) having an exemplary size and shape for illustrative purposes. However, it is understood that the microholes may be of essentially any pre-selected cross-sectional shape and dimension, the possible shapes including round, square, triangular, etc. The size of the microholes may be any dimension larger than 1 micrometer. The spacing between the holes may be of any dimension larger than 4 micrometers. Although a predetermined number of micro-holes are shown in FIG. 1(a) and FIG. 1(b), it is understood that any number of microholes may be included in micro-filter 1 in any desired arrangement.

The micro-filter of FIG. 1(a) and FIG. 1(b) may be manufactured in accordance with the procedure described below, with reference to FIGS. 2 thru 5.

Figure 2A:
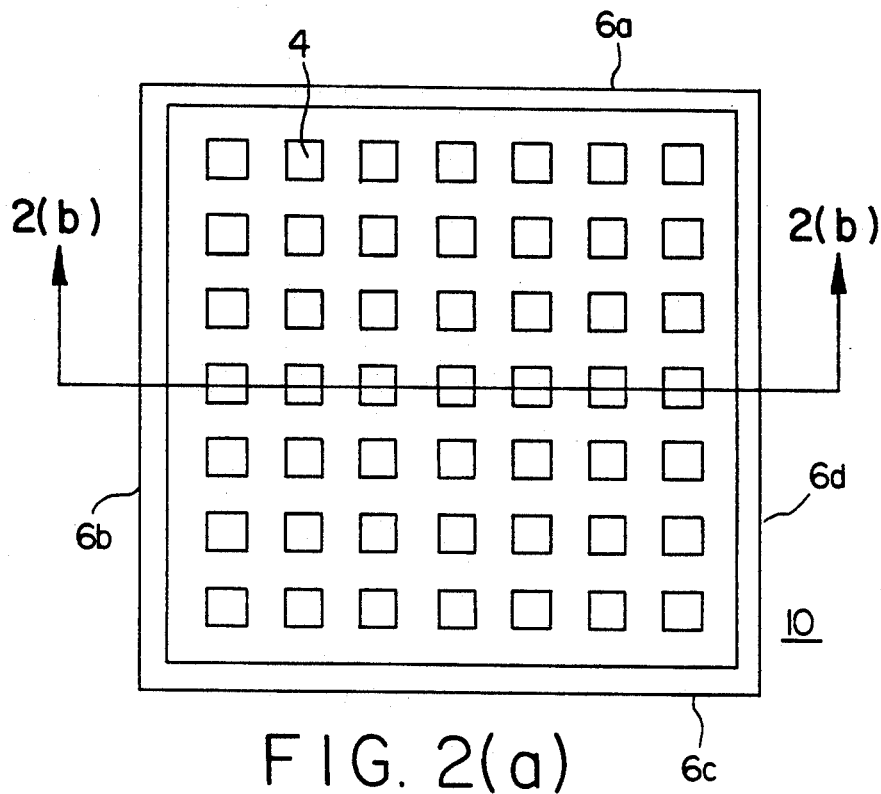
FIG. 2(a) is a top view of a micro-mold suitable for forming the precision micro-filter of FIG. 1(a).
Figure 2B:
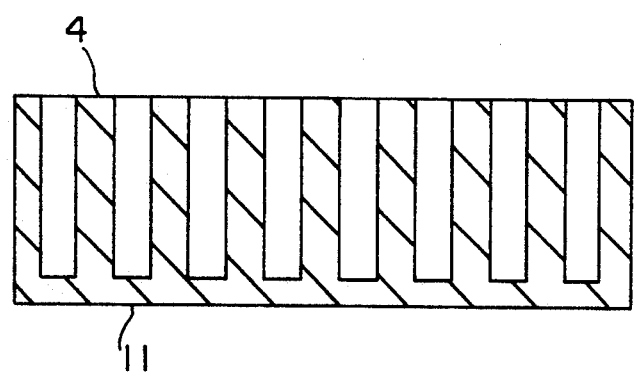
FIG. 2(b) is a cross-sectional, side view of the micro-mold of FIG. 2(a), taken in the plane B—B' of FIG. 2(a).

In FIG. 2(a), a top view of mold 10 used for producing precision micro-filter 1 is shown. In FIG. 2(b) a cross-sectional view of mold 10, taken in the plane B—B' of FIG. 2(a), is shown. Mold 10 may be constructed of a variety of materials including stainless steel, aluminum, copper, iron, tungsten, and their alloys. The only requirements are that the mold material must be micro-machinable, as discussed below, and must remain solid under the conditions which produce a change of state (from fluid to solid) in the molding composition to be used. Mold 10 comprises a base 11 and four side walls 6a-d, thus forming an open ended container. In this manner, mold 10 may be used to contain the liquid to be added later.

Mold 10 further comprises a plurality of rod-like protrusions 4, extending from base 11 and arranged in N rows and M columns (where N and M are integers). This plurality of rod-like protrusions are of preselected size, shape and spacing to conform to a negative "image", namely the micro-filter which is produced from this mold as described hereinbelow.

In order to form a micro-filter, adapted to selectively permit the passage and reject the passage of various sized particles, the micro-filter is desirably formed having passageways of spacing, shape and dimension which are precisely known. In accordance with the present invention, protrusions 4 of mold 10 are precisely constructed using micro-machining technology. Examples of suitable micro-machining techniques for manufacturing mold 10 include micro-electro-discharge machining, laser-beam micro-machining, or electron-beam micro-machining. The use of micro-machining technology is particularly desirable for the formation of mold 10, due to the highly precise structures which may be formed thereby.

In addition, the use of micro-machining technology allows for the formation of rod-like protrusions 4 within mold 10 with a tolerance of approximately 0.1 microns. This tolerance allows for the production of a micro-filter which is suitable for a variety of applications, including the separation of different sized cells. However, it is understood that larger tolerances are acceptable depending on the application for which the micro-filter is being produced. Thus, the acceptable tolerance with which rod-like protrusions are formed is largely application dependent.

Apparatus suitable for performing micromachining with high dimensional tolerance is described in a variety of references, including *Micro-EDM*, Li, H. and Masaki, T., Society of Manufacturing Engineers Technical Paper, MS91-485; *Micro Electro-Discharge Machining*, T. Masaki, K. Kawata, T. Sato, T. Mizutani, K. Yonemoti, A. Shibuya and T. Masuzawa, Proceedings of International Symposium for Electro-Machining, p, 26-29, 1989; *Micro EDMing Excites the High-Tech Community*, EDM Today, pp. 32, 34, 46, March/April 1991; Micro Electro-Discharge Machine Brochure, Matsushita Research Institute, Tokyo Inc. May 1990, herein incorporated by reference for their teachings in the field of micro-machining.

Figure 3A:
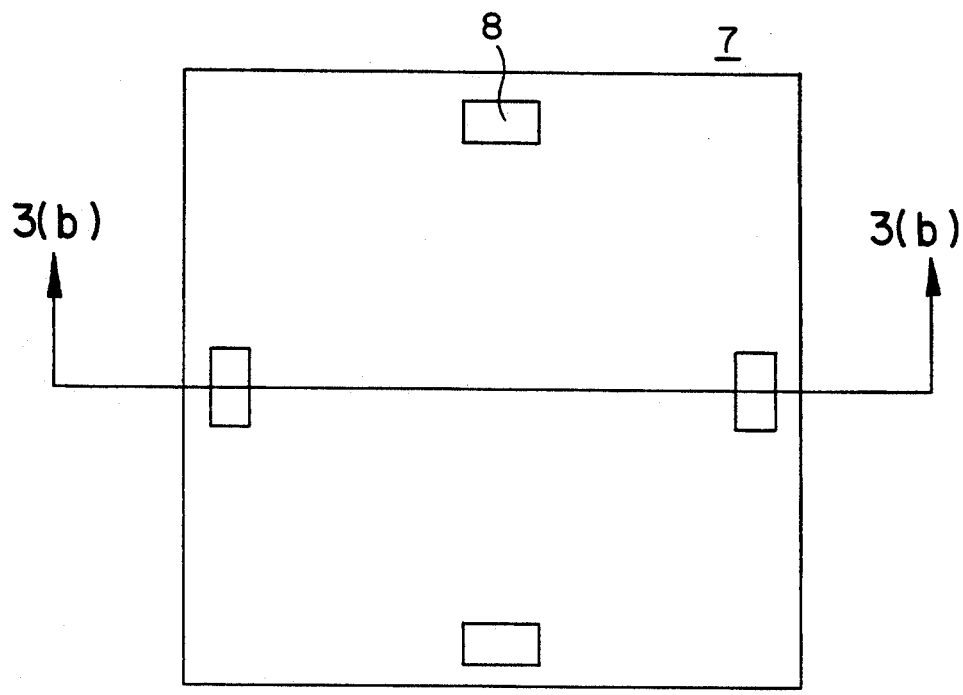
FIG. 3(a) is a top view showing a cover which is suitable for use with the micro-mold of FIG. 2(a).
Figure 3B:
FIG. 3(b) is a side, cross-sectional view showing the cover of FIG. 3(a), in the plane C—C' shown in FIG. 3(a).

In FIGS. 3(*a*) and 3(*b*), a cover 7 for mold 10 is shown. FIG. 3(*a*) is a top view of cover 7. FIG. 3(*b*) is a cross-sectional side view of cover 7, in the plane C—C' of FIG. 3(*a*). Cover 7 includes a plurality of openings 8.

Figure 4:
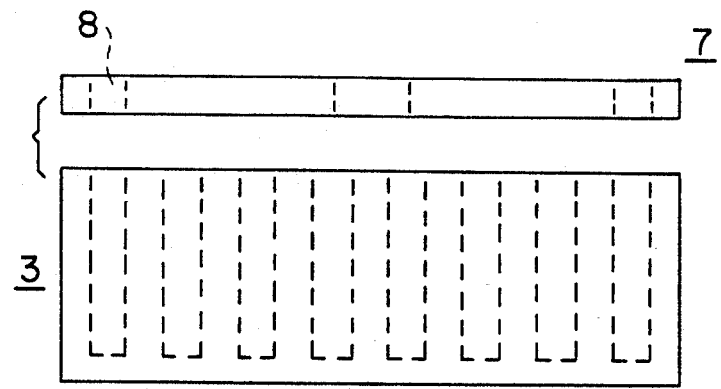
FIG. 4 is a side view of the micro-mold shown in FIG. 2(a) and the cover shown in FIG. 3(a), prior to assembly of the micro-mold and the cover.
Figure 5A:
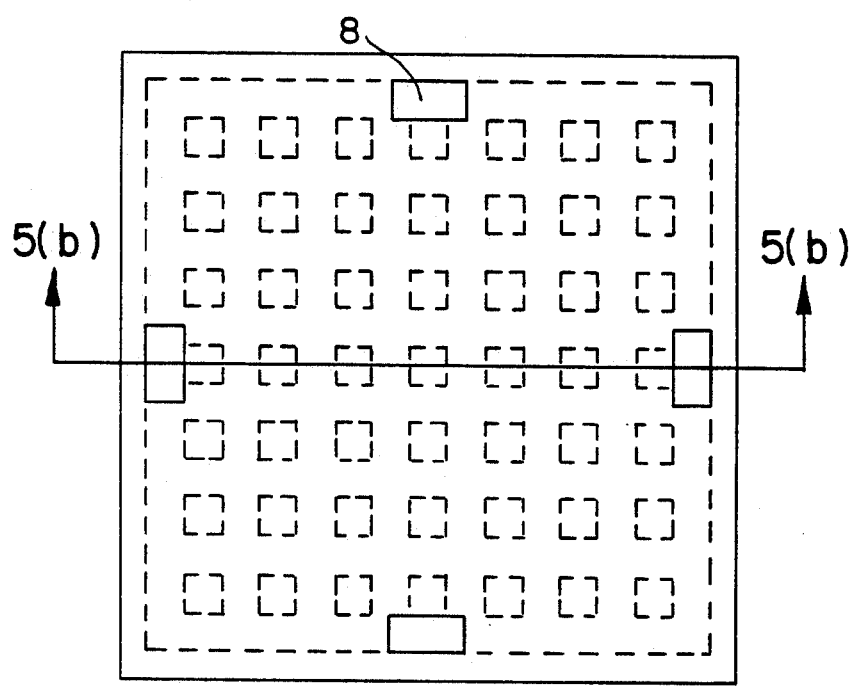
FIG. 5(a) is a top view of the micro-mold shown in FIG. 2(a) and the cover shown in FIG. 3(a), after assembly of the micro-mold and the cover to form a micro-mold/cover assembly.
Figure 5B:
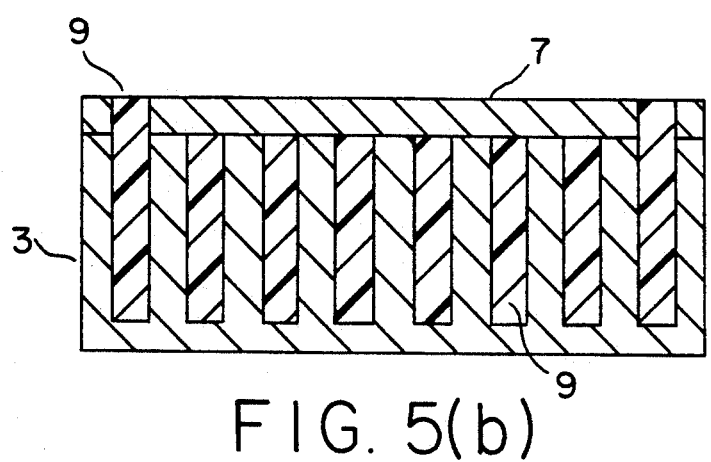
FIG. 5(b) is a side, cross-sectional view of the micro-mold/cover assembly of FIG. 5(a) in the plane D—D' shown in FIG. 5(a), including a molding composition in the interior space of the mold.

In order to form precision micro-filter 1, cover 7 is assembled with mold 10. FIG. 4 is a side view of micromold 10 and cover 7, prior to assembly of micro-mold 10 and cover 7. After micro-mold 10 is assembled with cover 7 (as shown in FIGS. 5(*a*) and 5(*b*)), thus forming a micro-mold/cover assembly, micro-mold 10 is filled with a fluid molding composition 9. Composition 9 may be a polymer (such as a polyester) or a ceramic. Composition 9 is added into the mold 10 through openings 8 until it fills the void spaces therein, within walls 6*a*–*d* and around protrusions 4. Composition 9 is then allowed to solidify.

After molding composition 9 has solidified, cover 7 is removed and micro-filter 1 is separated from mold 10.

Because the level of composition 9 may reach the top surface of cover 7, a plurality of protrusions 12 with the shape of cover openings 8, may be formed on the top surface of precision micro-filter 1. This is shown in FIGS. 1(*a*) and 1(*b*). However, the existence of protrusions 12, or the lack thereof, is immaterial to the proper operation of precision micro-filter 1.

By forming precision micro-filter 1 in the manner described above, a plurality of microopenings 2 are formed, wherein each microopening 2 corresponds precisely, without internal strain, to a respective rod 4 of mold 10. Thus each microopening 2 has a precisely known, preselected, shape and size. In addition, the spacing between each microopening 2 is preselected and precisely known.

In an alternative embodiment of the present invention, molding composition 9 is poured into mold 10 without the use of cover 7. In this manner, the top surface of micro-filter 1 is formed by horizontally disposed-gravity settling. However, without using cover 7, the top surface of micro-filter 1 thus produced may not be adequately smooth.

In a further alternative embodiment of the present invention, the inner surfaces of mold 10 are coated with a mold release agent and/or polished prior to pouring liquid material 9 into mold 10. In this manner, removal of completed micro-filter 1 from micro-mold 10 is eased. An exemplary mold release agent is silicone.

Thus, by forming a mold with high dimensional tolerances using a micro-machining apparatus, a finely detailed, micro-filter may be produced in which the spacing, shape and dimensions of the passageways are precisely controlled, with dimensions on the order of 1 micron and with dimensional tolerances on the order of 0.1 micron. Such a filter may find particular application in the selection, collection or purification of organic cells and other very small biological materials.

Furthermore, a micromold which is accurately manufactured in accordance with the present invention can be used repeatedly. The cost of manufacturing micromolds in accordance with the present invention is thus extremely low. As a result, high-precision and low-cost precision micro-filters may be made for a variety of applications, including medical, biotechnical and industrial uses.

While the invention has been described in terms of an exemplary embodiment, it is contemplated that it may be practiced as outlined above, with modifications within the spirit and scope of the appended claims.

What is claimed is:

1. A method of manufacturing a precision micro-filter, comprising the steps of:
   micromachining a mold material to form a micro-filter mold comprising a base and a plurality of protrusions extending substantially perpendicular from said base wherein micromachining includes one of micro-electro-discharge machining, laser-beam micro-machining and electron-beam micro-machining;
   introducing a liquid material into the micro-filter mold, said liquid material being a material selected from the group consisting of polymers and ceramics;
   allowing the liquid material to solidify and to form the precision micro-filter; and
   separating the precision micro-filter from the micro-filter mold.

2. A method of manufacturing a precision micro-filter in accordance with claim 1, wherein the width of each one of said plurality of protrusions is approximately 1 micrometer.

3. A method of manufacturing a precision micro-filter in accordance with claim 1, wherein each one of said plurality of protrusions has a dimensional tolerance of approximately 0.1 microns.

4. A method of manufacturing a precision micro-filter in accordance with claim 1, wherein said micro-filter mold is comprised of a material selected from the group consisting of stainless steel, copper, iron, aluminum, and tungsten.

5. A method of manufacturing a precision microfilter in accordance with claim 1, wherein the liquid material is allowed to solidify so as to form the precision microfilter wherein a plurality of micro openings extends completely through the precision microfilter upon solidification of the liquid material.

6. A method of manufacturing a precision microfilter in accordance with claim 1, wherein the precision microfilter includes a plurality of micro openings and wherein each one of said plurality of micro openings corresponds to a respective one of said plurality of protrusions.

7. A method of manufacturing a precision microfilter in accordance with claim 1, wherein the precision microfilter is separated from the mold without destroying the mold.

8. A method of manufacturing a precision micro-filter in accordance with claim 1, wherein the width of each one of said plurality of protrusions is 1 micrometer.

9. A method of manufacturing a precision micro-filter in accordance with claim 8, wherein each one of said plurality of protrusions has a dimensional tolerance of approximately 0.1 microns.

10. A method of manufacturing a precision micro-filter in accordance with claim 2, wherein each one of said plurality of protrusions has a dimensional tolerance of approximately 0.1 microns.

* * * * *